(12) United States Patent
Kittock et al.

(10) Patent No.: US 8,965,839 B2
(45) Date of Patent: *Feb. 24, 2015

(54) ON THE FLY DATA BINNING

(71) Applicant: International Business Machines Corporation, Armonk, NY (US)

(72) Inventors: Louis L. Kittock, Chicago, IL (US); Jon K. Peck, Santa Fe, NM (US); Vladimir E. Shklover, Skokie, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/222,069

(22) Filed: Mar. 21, 2014

(65) Prior Publication Data

US 2014/0207775 A1     Jul. 24, 2014

Related U.S. Application Data

(63) Continuation of application No. 13/719,675, filed on Dec. 19, 2012.

(51) Int. Cl.
*G06F 17/30* (2006.01)

(52) U.S. Cl.
CPC .... *G06F 17/30943* (2013.01); *G06F 17/30312* (2013.01)
USPC .......................................................... 707/603

(58) Field of Classification Search
CPC ................................................ G06F 17/30572
USPC ....................................................... 707/603
See application file for complete search history.

(56) References Cited

U.S. PATENT DOCUMENTS

| | | | |
|---|---|---|---|
| 4,847,785 | A | 7/1989 | Stephens |
| 5,729,732 | A | 3/1998 | Gal et al. |
| 5,960,435 | A | 9/1999 | Rathmann et al. |
| 6,026,397 | A | 2/2000 | Sheppard |
| 6,189,005 | B1 | 2/2001 | Chakrabarti et al. |
| 6,240,411 | B1 | 5/2001 | Thearling |
| 6,269,325 | B1 | 7/2001 | Lee et al. |
| 6,278,989 | B1 | 8/2001 | Chaudhuri et al. |
| 6,286,005 | B1 | 9/2001 | Cannon |

(Continued)

FOREIGN PATENT DOCUMENTS

| | | |
|---|---|---|
| WO | WO 00/34889 | 6/2000 |
| WO | WO 01/06396 | 1/2001 |

(Continued)

OTHER PUBLICATIONS

David Selby, Vince Thomas, Stephen Todd; "Method, System, and Computer Program Product for Sorting Data"; Database: Dossier (Simple); 2002.

(Continued)

*Primary Examiner* — Baoquoc N To
(74) *Attorney, Agent, or Firm* — Sawyer Law Group, P.C.

(57) ABSTRACT

A computer-implemented method, a computer-implemented system, and a computer program product for data binning are disclosed. In a first aspect, the computer-implemented method comprises in response to a determination that a data value is greater than an estimated maximum data value, calculating a new bin position for the data value by adding multiples of a bin width to the estimated maximum data value until a bin where the data value belongs is found.

7 Claims, 4 Drawing Sheets

(56) References Cited

U.S. PATENT DOCUMENTS

| | | |
|---|---|---|
| 6,311,173 B1 | 10/2001 | Levin et al. |
| 6,317,752 B1 | 11/2001 | Lee et al. |
| 6,374,251 B1 | 4/2002 | Fayyad et al. |
| 6,629,095 B1 | 9/2003 | Wagstaff et al. |
| 6,782,390 B2 | 8/2004 | Lee et al. |
| 6,917,926 B2 | 7/2005 | Chen et al. |
| 6,961,716 B2 | 11/2005 | Rhodes |
| 7,080,063 B2 | 7/2006 | Campos et al. |
| 7,577,142 B2* | 8/2009 | Kloth .................. 370/392 |
| 7,739,311 B2 | 6/2010 | Smith et al. |
| 8,577,142 B2 | 11/2013 | Otsuki |
| 2001/0054032 A1 | 12/2001 | Goldman et al. |
| 2002/0023078 A1 | 2/2002 | Liebler et al. |
| 2005/0033723 A1 | 2/2005 | Selby et al. |
| 2007/0176933 A1 | 8/2007 | Culpi et al. |
| 2008/0180382 A1 | 7/2008 | Hao et al. |
| 2010/0070904 A1 | 3/2010 | Zigon et al. |
| 2010/0281033 A1* | 11/2010 | Vojnovic et al. ........... 707/748 |
| 2010/0292995 A1 | 11/2010 | Bu et al. |
| 2011/0064296 A1 | 3/2011 | Dixon |
| 2011/0194766 A1* | 8/2011 | Otsuki .................. 382/168 |
| 2011/0242106 A1 | 10/2011 | Hao et al. |
| 2013/0067443 A1* | 3/2013 | Howard .................. 717/149 |

FOREIGN PATENT DOCUMENTS

| | | |
|---|---|---|
| WO | WO 01/29692 | 4/2001 |
| WO | WO 01/61615 | 8/2001 |

OTHER PUBLICATIONS

C. Conversano, et al., "Generalized additive multi-mixture model for data mining", Computational Statistics & Data Analysis, vol. 38, No. 4, Feb. 2002, pp. 487-500.

F. Esposito, "A Machine Learning Approach to Web Mining", AI*IA 99: Advances in Artificial Intelligence, 6th Congress of Italian Association for Artificial Intelligence, Bologna, Italy, Sep. 14-17, 1999 (Lecture Notes in Artificial Intelligence, vol. 1792), 10 pages—pp. 190-201.

G. Saarenvirta, "Operation Data Mining", DBS Magazine, vol. 6, No. 2, 2001, 5 pages.

S. Rosset, "Ranking—Methods for Flexible Evaluation and Efficient Comparison of Classification Performance", American Association for Artificial Intelligence, KDD-98 Proceedings, 1998, 5 pages.

G. Piatetsky-Shapiro, et al., "Estimating Campaign Benefits and Modeling Lift", In Proceedings of KDD-99, San Diego, CA, date unknown, pp. 185-193.

* cited by examiner

| Bin # | Bin Start | Bin End |
|---|---|---|
| 0 | -450.897 | < 405 |
| 1 | 405 | < 1260.897 |
| 2 | 1260.897 | < 2116.794 |
| 3 | 2116.794 | < 2972.691 |
| ... | ... | ... |
| 999 | 854,590.206 | < 855,446.103 |
| 1000 | 855,446.103 | < 856,302 |
| 1001 | 856,302 | < 857,157.897 |
| 1002 | 857,157.897 | < 858,013.794 |
| ... | ... | ... |

200

ON THE FLY DATA BINNING

CROSS-REFERENCE TO RELATED APPLICATION

Under 35 U.S.C. 120, this application is a Continuation Application and claims priority to U.S. application Ser. No. 13/719,675, filed Dec. 19, 2012, entitled "ON THE FLY DATA BINNING," which is incorporated herein by reference.

FIELD OF THE INVENTION

The present invention relates to data analysis, and more particularly, to a method and system utilized for efficient on the fly data binning analysis.

BACKGROUND

When plotting data in a histogram, scatterplot, or other charts, the data used for the chart is placed into bins to more readily interpret the data. For example, to plot employee ages, rather than a bar for each employee's age, the data can be binned into five-year bins to plot a separate bar for ages 20-25, 25-30, etc.

Conventional data binning analysis defines bins such that there are N number of bins, each having a width of W. If the range of data is not known beforehand, the data is scanned first to determine the range. After this initial scan, either the bin width (W) is calculated based on the desired bin count (N) or the bin count (N) is determined based on a desired bin width (W).

However, this conventional analysis requires that the data be read twice: once to obtain the range (minimum and maximum values of the data set) and then again to create the bins. When dealing with big data sets, it is inefficient and costly to perform binning this way. Therefore, there is a strong need for a cost-effective solution that overcomes the above issue. The present invention addresses such a need.

SUMMARY OF THE INVENTION

A computer-implemented method, a computer-implemented system, and a computer program product for data binning are disclosed. In a first aspect, the computer-implemented method comprises in response to a determination that a data value is greater than an estimated maximum data value, calculating a new bin position for the data value by adding multiples of a bin width to the estimated maximum data value until a bin where the data value belongs is found.

In a second aspect, the computer-implemented system comprises a processor and a memory coupled to the processor, wherein the memory includes an application which, when executed by the processor, causes the processor to: in response to a determination that a data value is greater than an estimated maximum data value, calculate a new bin position for the data value by adding multiples of a bin width to the estimated maximum data value until a bin where the data value belongs is found.

In a third aspect, the computer program product comprises a non-transitory computer readable medium having a computer readable program recorded thereon, wherein the computer readable program, when executed on a computer device, causes the computer device to: in response to a determination that a data value is greater than an estimated maximum data value, calculate a new bin position for the data value by adding multiples of a bin width to the estimated maximum data value until a bin where the data value belongs is found.

BRIEF DESCRIPTION OF THE DRAWINGS

The accompanying figures illustrate several embodiments of the invention and, together with the description, serve to explain the principles of the invention. One of ordinary skill in the art will recognize that the particular embodiments illustrated in the figures are merely exemplary, and are not intended to limit the scope of the present invention.

DETAILED DESCRIPTION OF PREFERRED EMBODIMENTS

The present invention relates to data analysis, and more particularly, to a method and system utilized for efficient on the fly data binning analysis. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

A method and system in accordance with the present invention estimates minimum and maximum values of a data set by a random data sampling. The estimates provide an estimated range that is utilized to determine a bin width based upon a desired number of bins. Utilizing the estimated range, bin width, and desired number of bins, a new bin position for a data value is calculated by either adding multiples of the bin width to the estimated maximum data value if the data value is greater than the estimated maximum data value or subtracting multiples of the bin width to the estimated minimum data value if the data value is lesser than the estimated minimum data value.

To describe the features of the present invention in more detail, refer now to the following description in conjunction with the accompanying Figures.

Figure 1:
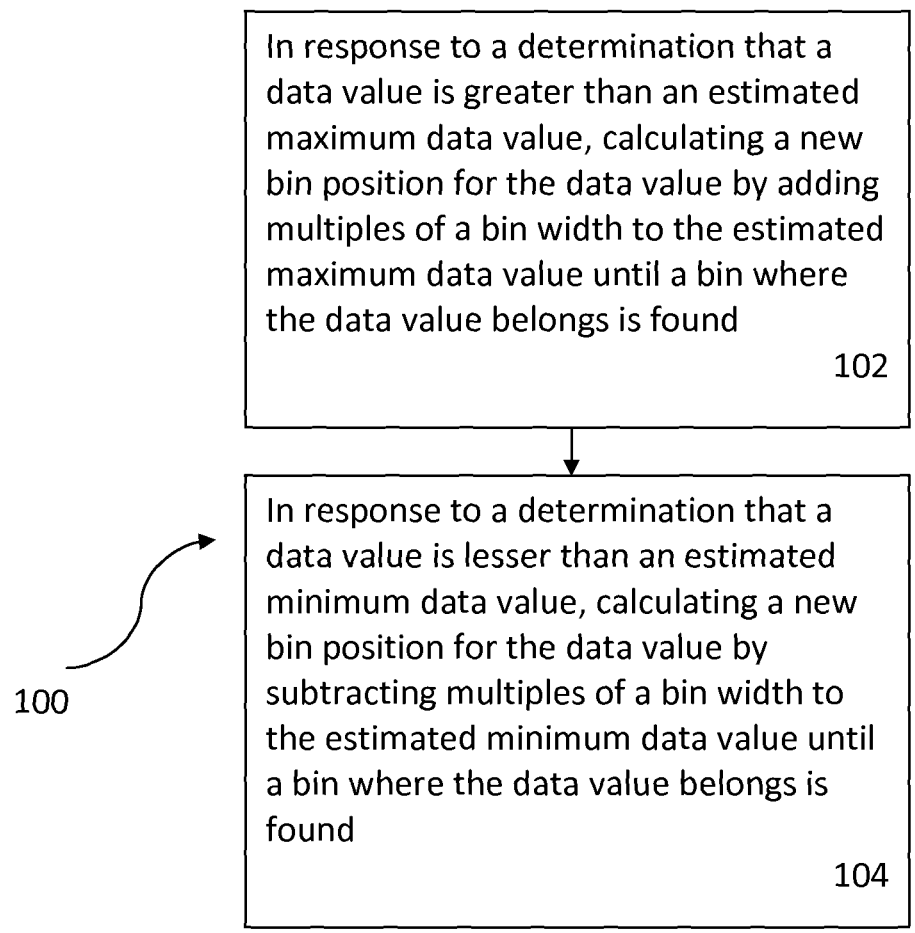
FIG. 1 illustrates a method for data binning in accordance with an embodiment.

FIG. 1 illustrates a method 100 for data binning in accordance with an embodiment. The method 100 comprises in response to a determination that a data value is greater than an estimated maximum data value, calculating a new bin position for the data value by adding multiples of a bin width to the estimated maximum data value until a bin where the data value belongs is found, via step 102, and in response to a determination that a data value is lesser than an estimated minimum data value, calculating a new bin position for the data value by subtracting multiples of a bin width from the estimated minimum data value until a bin where the data value belongs is found, via step 104.

In one embodiment, the estimated maximum data value and the estimated minimum data value are determined by a random data sampling to provide an estimated range. The random data sampling is done either by selecting a random sample of the data values or if the data is known to be randomly distributed, by selecting a first X number of data values.

Once the estimated range is determined and a desired number of bins (bin count) is selected, a bin width is calculated based upon the estimated range and the desired number of bins to complete an initial setup. In one embodiment, the bin width is determined using the estimated range and a desired number of bins. In one embodiment, the bin stores information including but not limited to a number of data values within the bin and a mean of the data values within the bin. Each time a data value is placed in a bin, the number of data values and the mean of the data values in the bin are updated.

In one embodiment, if one or more data values are found to lie outside of the estimated range, a new bin position for this value is calculated by adding multiples of the bin width to the estimated maximum data value, or subtracting multiples of the bin width from the estimated minimum data value, until the bin wherein the data value belongs is found. In one embodiment, the bins located outside of the estimated range are stored in a separate container including but not limited to a hash map.

In one embodiment, once all of the data values are read, the data values are efficiently graphed by plotting the number of data values and the mean of the data values for each bin. Accordingly, the data binning is on-the-fly and creates a distributional summary of a numeric variable with unknown data range using one data pass/read.

Figure 2:
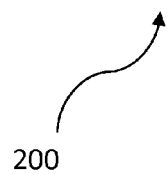
FIG. 2 illustrates a table related to data binning organization in accordance with an embodiment.

FIG. 2 illustrates a table 200 related to data binning organization in accordance with an embodiment. One of ordinary skill in the art readily recognizes that the table 200 can include but is not limited to varying lists of continuous data sets and that would be within the spirit and scope of the present invention.

For example, the table 200 is related to data binning of a continuous data set representing every integer from 1 to 1,000,000, wherein each integer exists exactly once. A random sample of 1,000 data values is taken from the data set and it is assumed that a desired number of bins is 1,000 (N=1000). In one embodiment, the random sample includes a minimum data value of 405 and a maximum data value of 856,301. Using the minimum and maximum data values, an estimated range is calculated as 855,897 (856,301−405+1=855,897) and a bin width (W) is calculated as 855.897 (855,897/1,000=855.897).

According to the aforementioned example, the bins are organized in the following table as follows:

| Bin # | Bin Start | Bin End |
|---|---|---|
| 0 | −450.897 | <405 |
| 1 | 405 | <1260.897 |
| 2 | 1260.897 | <2116.794 |
| 3 | 2116.794 | <2972.691 |
| ... | ... | ... |
| 999 | 854,590.206 | <855,446.103 |
| 1000 | 855,446.103 | <856,302 |
| 1001 | 856,302 | <857,157.897 |
| 1002 | 857,157.897 | <858,013.794 |
| ... | ... | ... |

In the table 200, the estimated range is 405 to 856,301 and based upon the predetermined desired number of bins being N=1000, the bin width (W) is determined to be 855.897. Therefore, for data values of the data set that fall outside of the estimated range, which covers bins 1 to 1000 and data values equal or greater than 405 and less than 856,302, multiples of the previously determined bin width (W) are utilized to determine a correct bin for each of these data values that fall outside of the estimated range.

For example, for a data value of 857,000 which is outside of the estimated range, an additional bin #1001 is created. The bin #1001 has a bin start value of 856,302 and a bin end value that is determined to be 857,157.897 by adding the previously determined bin width (855.897) to the bin start value (856,302+855.897=857,157.897). In this embodiment, bins #0 and 1001+ are considered outlier bins.

Figure 3:
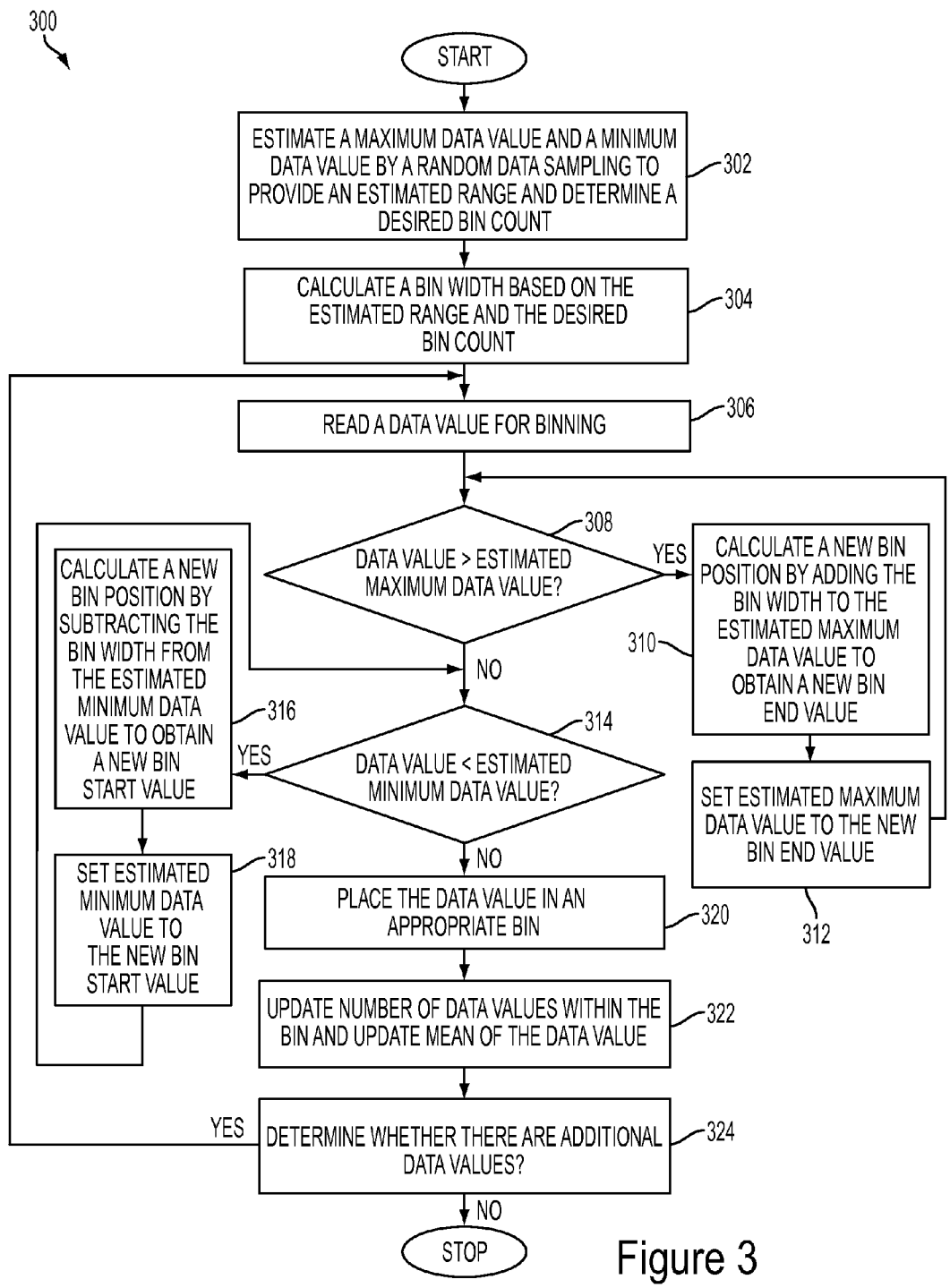
FIG. 3 illustrates a flowchart of data binning in accordance with an embodiment.

FIG. 3 illustrates a flowchart 300 of data binning in accordance with an embodiment. The flowchart 300 comprises estimating a maximum data value and a minimum data value by a random data sampling to provide an estimated range and determining a desired bin count, via step 302. A bin width is calculated based on the estimated range and the desired bin count, via step 304, and a data value is read for binning, via step 306.

The flowchart 300 includes determining if the data value is greater than the estimated maximum data value, via step 308. If the data value is greater, a new bin position is calculated by adding the bin width to the estimated maximum data value to obtain a new bin end value, via step 310, and the estimated maximum data value is then set to the new bin end value, via step 312. After step 312, the flowchart 300 returns back to step 308.

If the data value is not greater than the estimated maximum data value, it is determined if the data value is lesser than the estimated minimum data value, via step 314. If it is lesser than the estimated minimum data value, a new bin position is calculated by subtracting the bin width from the estimated minimum data value to obtain a new bin start value, via step 316, and the estimated minimum data value is then set to the new bin start value, via step 318. After completing step 318, the flowchart 300 returns back to step 314.

After determining whether the data value is either greater than the estimated maximum data value or lesser than the estimated minimum data value, the data value is placed in an appropriate bin, via step 320. If the data value is neither greater than the estimated maximum data value nor lesser than the estimated minimum data value, then it falls within the estimated range and the bins are allocated in accordance with the estimated range. Next, the number of data values within the bin and the mean of the data values are updated, via step 322, and whether there are additional data values is determined, via step 324. If there are additional values, return to step 306 to read the additional data values and proceed through the remaining steps of the flowchart 300.

In one embodiment, a system for on-the-fly binning creates a distributional summary of a numeric variable (e.g. a subset of data values of a data set) with an unknown data range and only uses one data pass. The system reads and stores a first M cases of the numeric variable, wherein M is a fixed constant number. The first M cases are utilized to calculate a sample range (e.g. an estimated range) that is expressed as a pair of minimum and maximum data values, to calculate a sample mean for the sample range, and to calculate a sample standard deviation of the sample range. The estimated maximum and minimum values are calculated by adding or subtracting multiples of the sample standard deviation to/from the sample mean.

The system creates an extended range by adding a fixed multiple of the sample standard deviation to the ends of the sample range and creates an array of bin frequencies by dividing the extended range into a desired number of equal-sized bins (N). The system creates an exceptional values map from bin to count that is initially empty. For each data value case (X) in both the originally stored M cases and the subsequent data cases, the system determines if the data value X lies within the extended range. If so, then the count for that bin is incremented in the array of bin frequencies and the mean for that bin is updated.

If not, and the value x lies outside the extended range, then the bin that the data value x would occupy if the bins were infinitely extended is calculated, the mean for that bin is updated or created, and the map of exceptional values is used to access and increment the relevant count or create a count with a value of one if it does not exist. The union of the array of bin frequencies and exceptional values represent a distribution that is used for a variety of statistical techniques including but not limited to histograms and frequency tables.

As above described, the method and system allow for on-the-fly data binning which creates a distributional summary of a numeric variable with unknown data range using one data pass/read. By determining an estimated range from estimated minimum and maximum data values and a desired bin count (N), and calculating a bin width (W) to describe a multiples functionality, a cost-effective and efficient data binning analysis system across a wide variety of situations is achieved.

A computer-implemented method, a computer-implemented system, and a computer program product for data binning have been disclosed. Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable storage medium providing program code or program instructions for use by or in connection with a computer or any instruction execution system. For the purposes of this description, a computer-usable or computer-readable storage medium can be any apparatus that can contain, store, communicate, propagate, or transport the program for use by or in connection with the instruction execution system, apparatus, or device.

The computer-readable storage medium may be an electronic, magnetic, optical, electromagnetic, infrared, semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-RAN).

Figure 4:
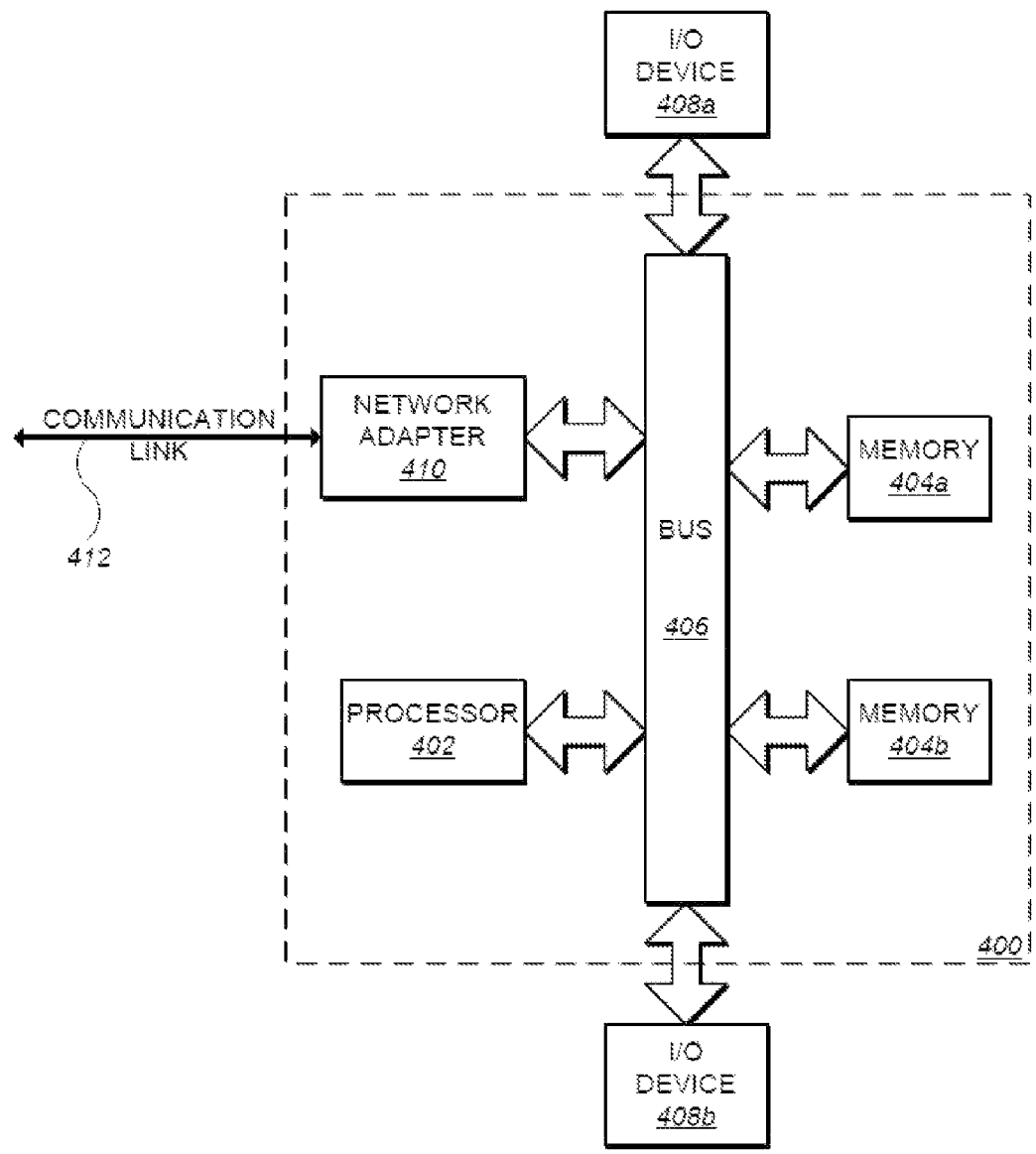
FIG. 4 illustrates a data processing system suitable for storing the computer program product and/or executing program code in accordance with an embodiment.

FIG. 4 illustrates a data processing system 400 suitable for storing the computer program product and/or executing program code in accordance with an embodiment. The data processing system 400 includes a processor 402 coupled to memory elements 404a-b through a system bus 406. In other embodiments, the data processing system 400 may include more than one processor and each processor may be coupled directly or indirectly to one or more memory elements through a system bus.

Memory elements 404a-b can include local memory employed during actual execution of the program code, bulk storage, and cache memories that provide temporary storage of at least some program code in order to reduce the number of times the code must be retrieved from bulk storage during execution. As shown, input/output or I/O devices 408a-b (including, but not limited to, keyboards, displays, pointing devices, etc.) are coupled to the data processing system 400. I/O devices 408a-b may be coupled to the data processing system 400 directly or indirectly through intervening I/O controllers (not shown).

In FIG. 4, a network adapter 410 is coupled to the data processing system 400 to enable data processing system 400 to become coupled to other data processing systems or remote printers or storage devices through communication link 412. Communication link 412 can be a private or public network. Modems, cable modems, and Ethernet cards are just a few of the currently available types of network adapters.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-implemented method for data binning, the computer-implemented method comprising:
   in response to a determination that a data value is greater than an estimated maximum data value, calculating a new bin position for the data value by adding multiples of a bin width to the estimated maximum data value until a bin where the data value belongs is found; and
   in response to a determination that a data value is lesser than an estimated minimum data value, calculating a new bin position for the data value by subtracting multiples of a bin width from the estimated minimum data value until a bin where the data value belongs is found.

2. The computer-implemented method of claim 1, wherein the estimated maximum data value and the estimated minimum data value are determined by a random data sampling to provide an estimated range.

3. The computer-implemented method of claim 2, wherein the bin width is determined using the estimated range and a desired number of bins.

4. The computer-implemented method of claim 1, wherein the bin comprises a number of data values within the bin and a mean of the data values.

5. The computer-implemented method of claim 4, further comprising:
   updating the number of data values within the bin and the mean of the data values each time a data value is placed in the bin.

6. The computer-implemented method of claim 2, wherein bins outside the estimated range are outlier bins that are stored in a separate hash map container.

7. The computer-implemented method of claim 1, wherein the data binning creates a distributional summary of a numeric variable with unknown data range using one data pass.

* * * * *